No. 701,705. Patented June 3, 1902.
S. FURMIDGE.
WHEEL.
(Application filed Jan. 2, 1902.)
(No Model.)
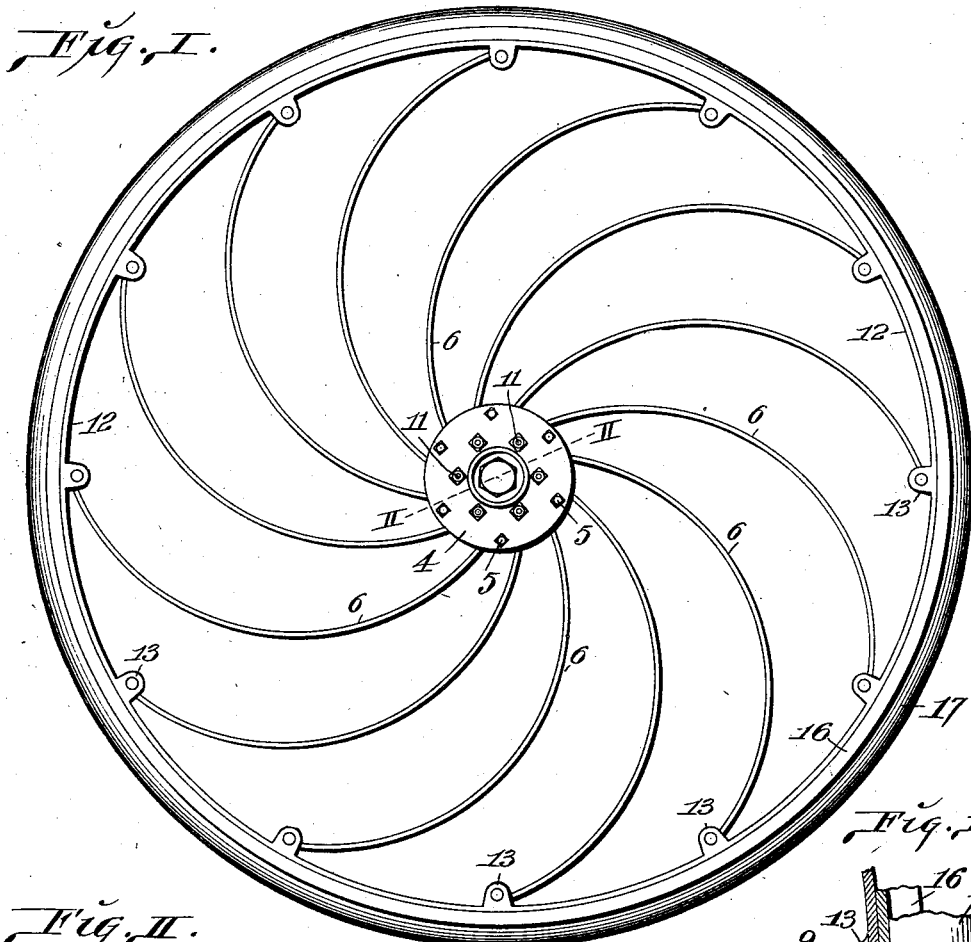
Fig. I.
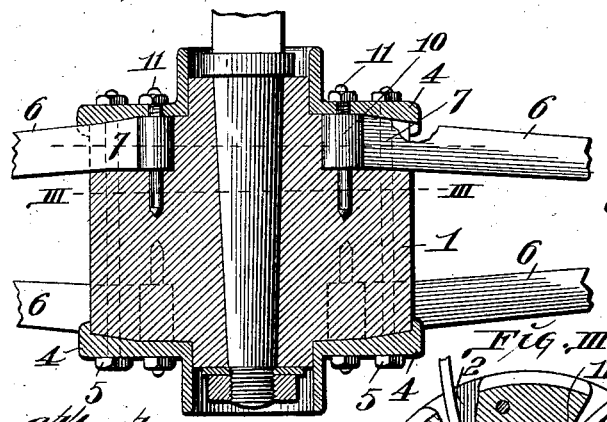
Fig. II.
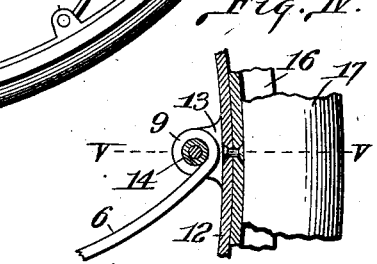
Fig. IV.
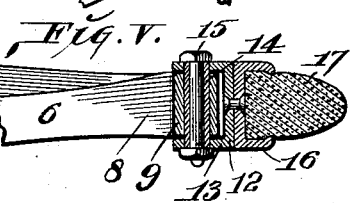
Fig. V.
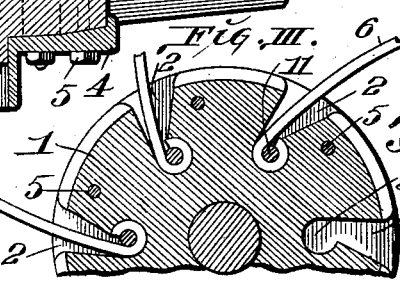
Fig. III.
Attest:—
M. P. Smith
E. S. Knight
Inventor:—
Samuel Furmidge;
By Knight Bro
Atty's.

UNITED STATES PATENT OFFICE.

SAMUEL FURMIDGE, OF ST. LOUIS, MISSOURI, ASSIGNOR TO THE FURMIDGE SPRING WHEEL COMPANY, OF PIERRE, SOUTH DAKOTA, A CORPORATION.

WHEEL.

SPECIFICATION forming part of Letters Patent No. 701,705, dated June 3, 1902.

Application filed January 2, 1902. Serial No. 88,060. (No model.)

*To all whom it may concern:*

Be it known that I, SAMUEL FURMIDGE, a citizen of the United States, residing in the city of St. Louis, in the State of Missouri, have invented certain new and useful Improvements in Wheels, of which the following is a full, clear, and exact description, reference being had to the accompanying drawings, forming part of this specification.

My invention relates to that class of wheels in which spring-spokes are utilized to provide resilience therein for utility in lieu of the usual vehicle-springs; and the invention consists in features of novelty hereinafter fully described, and pointed out in the claims.

Figure I is a view in side elevation of my improved wheel. Fig. II is a cross-sectional view taken on line II II, Fig. I. Fig. III is a cross-sectional view taken on line III III, Fig. II. Fig. IV is a detail view, partly in cross-section, of fragments of the wheel-rim, one of the spokes, the tire-ring, and the tire applied to said ring. Fig. V is a cross-sectional view taken on line V V, Fig. IV.

1 designates the hub of the wheel, preferably of metal, and provided at the ends with V-shaped notches 2, extending inwardly from the periphery of the hub and open at the hub ends. The notches 2 terminate in curved pockets 3 at their inner ends within the hub.

4 designates end caps applied to the ends of the hub 1 and held by bolts 5, that pass through the caps and hub, as most clearly shown in Fig. II.

6 designates spring-spokes having widened inner ends 7 and widened outer ends 8, the spokes being preferably of flat shape in cross-section. The outer end of each spoke is provided with an eye 9, formed by producing a curl at the end of the spoke, and at the inner end of each spoke is an eye 10, similarly formed. The inner ends of the spokes 6 are seated in the V-shaped notches 2, and the eyes 10 occupy the curved pockets 3, in which they are capable of play and held by pins or bolts 11, inserted through the end caps 4 and passed through the eyes 10 into the hub 1. (See Fig. II.) By the application of the spokes to the hub in the manner stated play of the spokes is permitted in the V-shaped notches 2, and the inner spoke-eyes being seated in the curved pockets 3 vibration of the spokes is allowed, thus constituting a loose connection between each spoke and the hub, that obviates any liability of sudden jars or jerks due to the springing of the spokes in the practical use of the wheel. It is therefore evident that a connection so made is of great utility, inasmuch as it avoids possibility of the breakage of the spokes under sudden strain upon the wheel and at the same time adds to the ease of movement of the spokes in their attachment to the hub, and thereby increases their resiliency.

12 designates the rim of the wheel, that is provided with ears 13, within which the outer eyes 9 of the spokes are seated.

14 designates bushings set into the ears 13, (see Figs. IV and V,) the said bushings being preferably of hardened steel and receiving the outer spoke-eyes by which they are encircled. The bushings 14 are held in the ears 13 by bolts 15 passing therethrough and serving as spindles for said bushings. By the use of the bushings 14 superior bearings for the outer spoke-eyes are obtained to receive the wear incident to the play of the spokes within the ears 13 in the practical use of the wheel and greater rigidity of bearing is obtained.

16 is a tire-ring fixed to the rim 12, adapted to receive and hold the tire 17, that may be of rubber or any other desirable material.

As hereinbefore stated, the spokes 6 are provided with widened inner ends 7 and widened outer ends 8. This construction of spring-spoke is of material merit, owing to the fact that to produce the desirable resilience in the spoke it is necessary that it be as light in weight as possible in order to obtain the required resiliency, while at the same time it is essential that sufficient strength be maintained at the inner and outer ends of the spokes to receive any lateral strain to which the spokes may be subjected. By making the spoke narrow at its central portion and widened at its ends I obtain the desired resilience and at the same time retain ample strength at the end of the spoke, where the most strength is necessary.

In the construction of this wheel the inner ends of the spring-spokes are held within the wheel-hub by the eyes or enlarged terminations thereof, which are confined in the curved pockets or enlargements of the V-shaped notches 2. The pins 11 pass through the eyes or enlargements of the spokes to centralize the eyes within the pockets 3 and serve to maintain the proper bearing of the eyes, while the end caps 4 serve to confine the spokes from lateral movement and escape from the notches in the hub.

I claim as my invention—

1. A hub having notches extending from the periphery toward the center thereof and terminating in pockets at their inner ends, and spokes swingingly fitted in said notches and pockets; whereby the spokes are movably connected to the hub, substantially as set forth.

2. In a wheel the combination of a rim, spring-spokes loosely connected to said rim, and a hub provided with inwardly-narrowing notches in which said spokes are loosely seated and adapted to play, substantially as set forth.

3. In a wheel, the combination of a rim, spring-spokes loosely connected to said rim, and a hub provided with V-shaped notches terminating at their inner ends in curved pockets in which said spokes are loosely seated and adapted to play, substantially as set forth.

4. In a wheel, the combination of a hub provided with V-shaped notches terminating at their inner ends in curved pockets, spokes having enlarged inner ends seated in said pockets and adapted to play in said notches, and a rim to which the outer ends of said spokes are loosely seated, substantially as described.

5. In a wheel, the combination of a hub, provided with notches terminating at their inner ends in pockets and open at the ends of the hub, spokes having enlarged inner ends loosely seated in said notches and pockets, end caps applied to said hub, and a rim to which the outer ends of said spokes are loosely connected, substantially as described.

6. In a wheel, the combination of a hub provided with V-shaped notches terminating at their inner ends in curved pockets, spokes having eyes at their inner ends seated in said pockets and adapted to play in said notches, end caps fitted to the ends of said hub, pins seated in said end caps and hubs, and passing through the eyes of said spokes, and a rim to which the outer ends of said spokes are loosely connected, substantially as described.

7. As a new article of manufacture, a spring-spoke having a narrow central portion and widened ends, substantially as described.

8. As a new article of manufacture a spoke having a narrow central portion and widened ends, and provided at its ends with eyes, substantially as described.

SAMUEL FURMIDGE.

In presence of—
G. S. KNIGHT,
M. P. SMITH.